T. G. GERDINE.
DEMOUNTABLE RIM.
APPLICATION FILED AUG. 2, 1920.
1,392,009.
Patented Sept. 27, 1921.
2 SHEETS—SHEET 1.
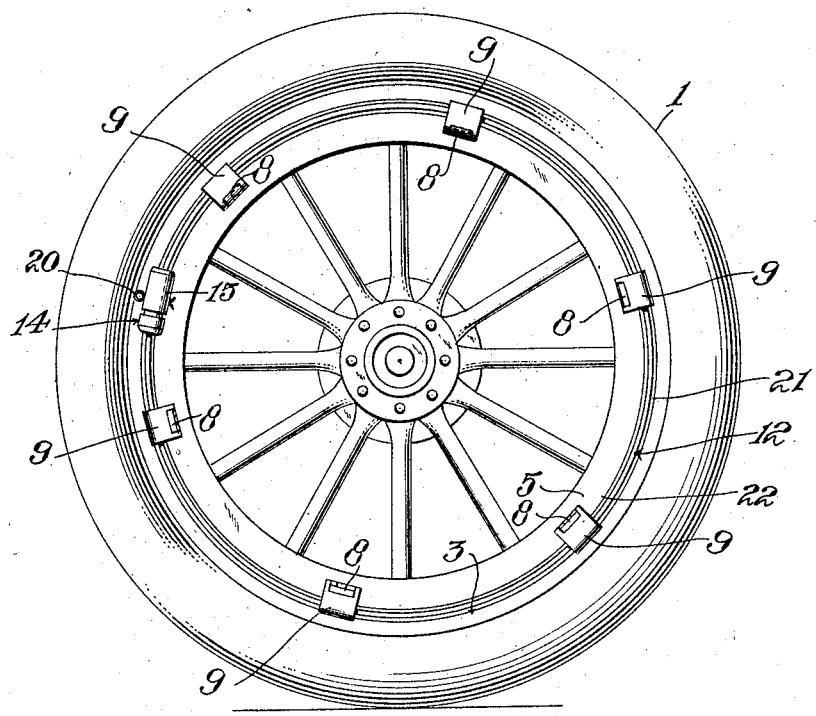
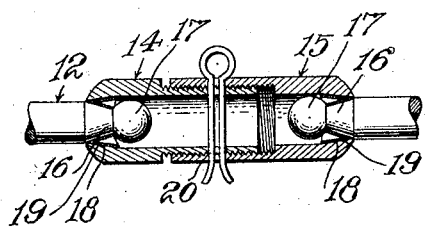
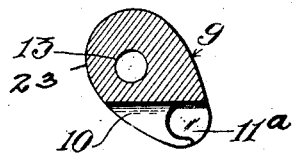
Inventor
Thomas G. Gerdine
By Fenelon B. Brock
Attorney

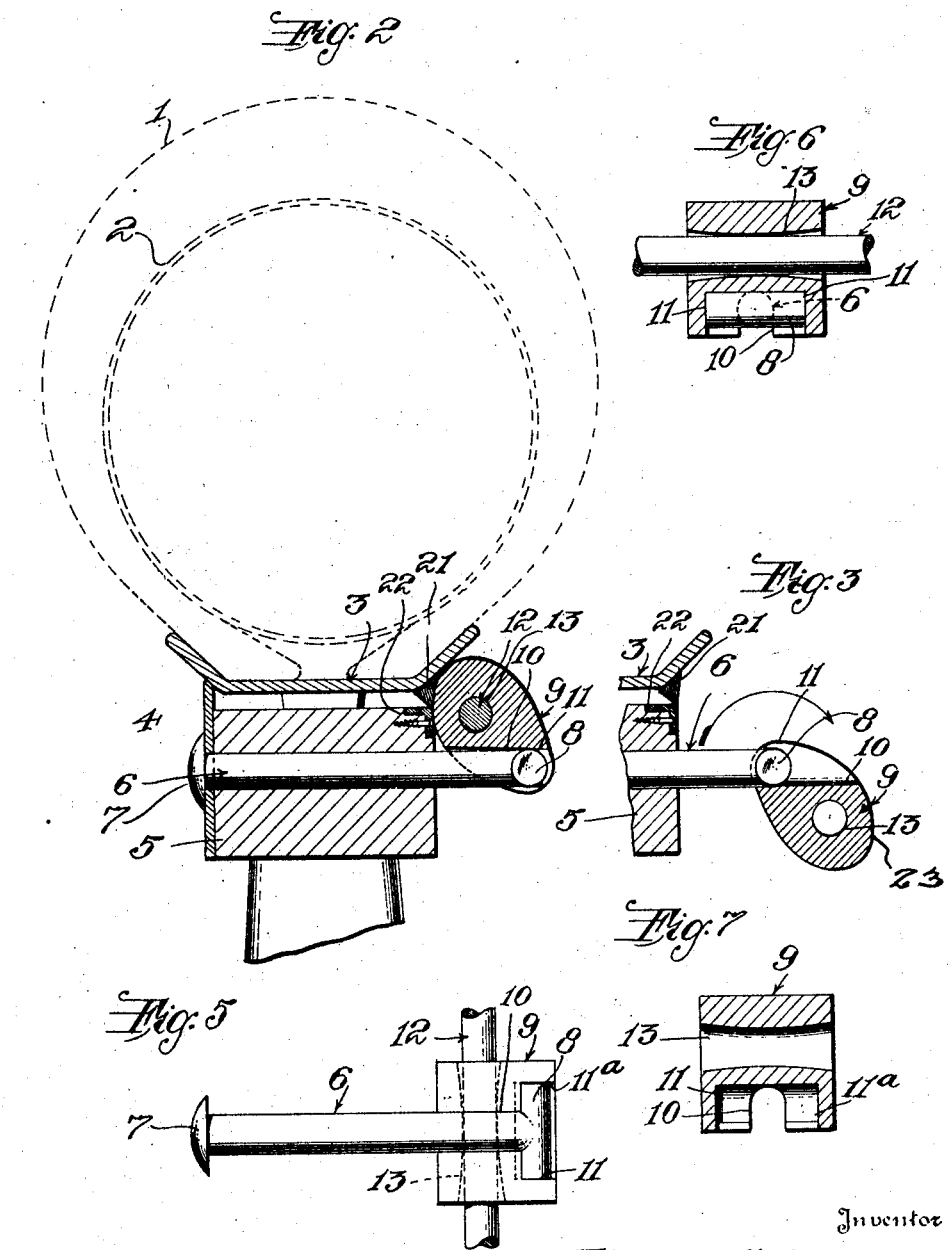

UNITED STATES PATENT OFFICE.

THOMAS G. GERDINE, OF WEST FALLS CHURCH, VIRGINIA.

DEMOUNTABLE RIM.

1,392,009.  Specification of Letters Patent.  Patented Sept. 27, 1921.

Application filed August 2, 1920. Serial No. 400,731.

*To all whom it may concern:*

Be it known that I, THOMAS G. GERDINE, a citizen of the United States, residing at West Falls Church, county of Fairfax, and State of Virginia, have invented certain new and useful Improvements in Demountable Rims, of which the following is a full and clear description.

The invention contemplates an improved demountable rim, designed particularly for the purpose of providing a fastening device for the rim and tire of automobile and other vehicle wheels, by means of which the tire may be quickly secured in place on the wheel and effectively retained thereon, and may, with equal facility be unfastened for the purpose of demounting the tire.

The invention consists in certain novel combinations and arrangements of parts involving a single expansible and contractible ring carried by the felly of a wheel, and a plurality of latches or locking lugs co-acting with the rim of the wheel and carried by said ring, for retaining the rim and tire in locked position on the felly of the wheel, as will be hereinafter pointed out and claimed.

In the accompanying drawings I have illustrated one complete example of the physical embodiment of my invention involving a locking ring and locking lugs or latches and their connections, in which the parts are combined and arranged according to the best mode I have thus far devised for the practical application of the principles of my invention.

Figure 1 is a side view showing an automobile wheel equipped with the device of my invention.

Fig. 2 is an enlarged, transverse sectional view through the wheel tire and felly illustrating one of the locking lugs or latches, the tension ring, and one of the supporting bolts for the ring, the parts being in locked position.

Fig. 3 is a detail view showing one of the latches in unlocked position for demounting the rim.

Fig. 4 is a detail, longitudinal sectional view of the tension device or turn buckle connecting the ends of the tension ring.

Fig. 5 is a plan view of a locking lug, supporting latch-bolt, and part of the locking or tension ring.

Fig. 6 is a detail sectional view at line 6—6 of Fig. 2.

Fig. 7 is a view similar to figure 6 with the tension ring and bolt-head removed.

Fig. 8 is a detail, transverse sectional view of one of the latches or lugs.

In the preferred form of my invention as illustrated in the drawings I have shown a standard form of wheel including the tire casing 1, inner tube 2, metal rim 3, and side plate 4 of usual or suitable construction, used in combination with the usual wood felly 5 of the wheel, and forming part of a well known type of demountable rim and tire.

In converting the wheel for use with my invention I employ a number of spaced, transversely disposed bolts 6 that are utilized to secure the side plate 4 to the felly. These bolts pass transversely through the felly and have riveted or upturned heads 7 for retaining the side plates, while at their opposite ends the bolts are fashioned with T-heads 8 projecting at right angles to the longitudinal axis of the bolts.

The required number of these bolts are utilized and spaced at proper intervals about the wood felly, and the T-heads project a suitable distance from the side of the felly to permit attachment to each bolt of a locking latch or lug indicated as a whole by the numeral 9.

Inasmuch as the bolts and latches are standardized and of common or similar construction, a description of a bolt and a lug or latch will be sufficient for all of them. To accommodate the bolt, the latch is provided with a transversely extending groove 10 of proper dimensions to receive that portion of the bolt near its T-head, and the T-head of the bolt is fitted or journaled in a pair of oppositely disposed recesses 11 and 11ª located at opposite sides of the slot or groove 10, and communicating therewith. In Fig. 8 it will be seen that these recesses extend a sufficient distance into the lug to form a bearing for the T-head, and that they are alined with the groove 10. Thus the lug may be applied to the bolt by fitting the longitudinal groove formed by the two recesses over the T-head and turning the lug down in order that the groove 10 may fit over the bolt adjacent to the head. In this position the lug is free to oscillate on the head with the recesses as a bearing, and it will readily be apparent that the lugs may also be withdrawn from the T-heads of the bolts with facility, by withdrawing the recessed lug from the T-head.

These pivotally supported latches or lugs carry or support a divided metal ring or band 12, and each latch is fashioned with a longitudinally extending opening 13 to receive the ring, which may be termed a tension ring. The openings 13 have double tapered walls, outwardly flaring from both sides of the center, to permit relative movement of the latches on the ring when fastening or unfastening the rim on the felly of the wheel.

The tension ring is passed through the several latches, or the latches may be slipped, successively, over the ends of the divided ring, which ends are connected by a turn-buckle or tension device comprising the two threaded sections 14 and 15.

Various means may be utilized for connecting the two ends of the tension ring, one of which is indicated in Fig. 4, wherein the ends of the divided ring are provided with an annular groove 16 to form a rounded extremity or head 17. Within the tapered or conical end openings 18 of the turn-buckle sections are seated complementary thimbles 19, to form effective connection sleeves between the turn buckle sections and the divided ends of the tension ring. Thus it will be apparent that the threaded head on section 14 may be turned in the threaded socket on section 15 of the turn buckle, in order that the circumference and diameter of the divided ring may be increased or decreased.

If desired a cotter pin 20 may be passed through registering openings in the two threaded sections of the turn buckle to prevent relative movement of these parts after they have been adjusted. The pin projects sufficiently beyond the periphery of the buckle to encounter the felly of the wheel and thus prevent turning of the locked sections.

Preferably an annulus or metal ring 22 angular in cross section is fixed at the outer edge of the wood felly, as a wear ring, and an additional wear ring or filler-ring 21 is located between the flared edge of the metal rim and this wear ring. The bearing edge 23 of each of the latches or lugs engages against these wear and filler rings to retain the rim in position.

The pivotal support of the lugs on the divided tension ring is relatively fixed, and these supports are spaced in alinement around the felly at the side thereof. The lugs are adapted to oscillate on their pivot supports to swing the ring toward or away from the felly and rim. Thus, in mounting the rim on the felly, with the tire, rim, side plate, and filler ring in proper position, the sections of the turn buckle are turned to extend the length of the buckle and thus lengthen ring sufficiently to permit the ring to be swung, through the oscillatable latches pivoted on the T-heads as a center, over the heads as a center, until the bearing portions of the lug encounter the filler ring, rim and wear ring of the felly. Now the ring is shortened by turning the threaded sections of the turn buckle to decrease the diameter of the ring, and by this action the several lugs or latches are caused to turn down toward the wheel into close frictional contact with the rim, filler ring and wear ring, thus locking the tire within the rim. To demount the rim, the buckle is loosened and the ring lengthened sufficiently to permit it to swing away from the wheel, and over the alined T-heads if desired. Then the filler ring and rim may be displaced and the rim dismounted.

What I claim is—

1. The combination with a wheel rim and felly, of an extensible and contractible annulus, a plurality of latches pivotally supported on said wheel, and connections between said latches and annulus whereby the former may be forced into locking position with relation to the rim.

2. The combination with a wheel and its demountable rim, of a divided ring and a turn buckle connecting its ends, a plurality of latches, fixed bolts on the wheel for pivotally supporting said latches and connections between said ring and latches whereby the latches, by action of the turn buckle, may be forced into locking position with relation to said rim.

3. The combination with a wheel and its demountable rim, of a divided ring and extensible coupling member, a series of latches carried by said ring having grooves and recesses, and fixed bolts on the wheel each having a T-head for pivotally supporting said latches.

4. The combination in a fastening device for a demountable tire-rim with a tension annulus, of a series of transverse bolts supported in a wheel and each fashioned with a T-head, and a series of latches carried by said annulus each fashioned with a groove and recesses complementary to said bolts.

5. The combination with a wheel and its demountable rim, a felly, and a filler ring between said rim and felly, of a ring and its extensible coupling member connecting the ring ends, a series of latches having longitudinal openings and carried by said ring, fixed bolts on the felly having T-heads, and said latches having slots and recesses to accommodate said bolts, for the purpose described.

THOMAS G. GERDINE.